US010173733B2

(12) United States Patent
Canner

(10) Patent No.: US 10,173,733 B2
(45) Date of Patent: Jan. 8, 2019

(54) MULTI-PURPOSE STUD MOUNT APPARATUS

(71) Applicant: MANN+HUMMEL GMBH, Ludwigsburg (DE)

(72) Inventor: Richard Canner, Portage, MI (US)

(73) Assignee: MANN+HUMMEL GmbH, Ludwigsburg (DE)

( * ) Notice: Subject to any disclaimer, the term of this patent is extended or adjusted under 35 U.S.C. 154(b) by 384 days.

(21) Appl. No.: 15/004,966

(22) Filed: Jan. 24, 2016

(65) Prior Publication Data

US 2016/0214654 A1 Jul. 28, 2016

Related U.S. Application Data

(60) Provisional application No. 62/107,929, filed on Jan. 26, 2015.

(51) Int. Cl.
*B62D 27/06* (2006.01)
*B60K 13/00* (2006.01)
*F16B 5/06* (2006.01)
*F16B 5/02* (2006.01)
*F16B 21/07* (2006.01)

(52) U.S. Cl.
CPC ............ *B62D 27/065* (2013.01); *B60K 13/00* (2013.01); *F16B 5/065* (2013.01); *F16B 5/02* (2013.01); *F16B 21/073* (2013.01)

(58) Field of Classification Search
CPC ......... B62D 27/06; B62D 27/065; F16B 5/02; F16B 5/06; F16B 5/0621; F16B 5/065; B60R 2011/0052; B60R 2011/0059; B60R 2011/0064; B60R 2011/0066; B60R 2011/071
See application file for complete search history.

(56) References Cited

U.S. PATENT DOCUMENTS

| 5,599,148 A * | 2/1997 | Hirose ................... B60N 3/046 411/112 |
| 5,746,559 A * | 5/1998 | Shirai ................... B60Q 1/0683 362/421 |
| 6,287,064 B1 * | 9/2001 | Jhumra ................. F16B 37/043 411/112 |
| 2006/0242802 A1 * | 11/2006 | Scroggie ................. F16B 5/065 24/297 |
| 2012/0093610 A1 * | 4/2012 | Homner ................ F16B 21/073 411/347 |
| 2015/0291225 A1 * | 10/2015 | Yao ....................... B62D 27/065 296/203.01 |

FOREIGN PATENT DOCUMENTS

| DE | 197 01 365 | * | 7/1998 | .............. F16B 17/00 |
| DE | 101 04 757 | * | 8/2002 | .............. B62D 25/00 |
| DE | 10 2013 200 689 | * | 7/2014 | ................ F16B 5/02 |
| WO | WO 2012/083186 | * | 6/2012 | ................ F16B 5/02 |

* cited by examiner

*Primary Examiner* — Michael P Ferguson
(74) *Attorney, Agent, or Firm* — James Hasselbeck

(57) ABSTRACT

A multi-purpose stud mounting apparatus is provided to mountably and detachably couple a threaded mounting stud of a motor vehicle body or internal combustion engine and a functional component, such as an air filter housing air intake duct or air intake resonator so as to releaseably and supportively mount the functional component to the vehicle.

4 Claims, 3 Drawing Sheets

US 10,173,733 B2

MULTI-PURPOSE STUD MOUNT APPARATUS

CROSS-REFERENCE TO RELATED APPLICATION

This application claims the benefit of U.S. Provisional Application No. 62/107,929, filed Jan. 26, 2015.

TECHNICAL FIELD

The invention relates to a stud mount apparatus for detachably mounting a functional component onto a vehicle component such as an internal combustion engine or a body part where there may be a stud or a mounting tap suitable for a stud.

SUMMARY OF THE INVENTION

An objective of the present inventive disclosure is to provide a multi-purpose stud mounting apparatus that is configured to mountably and detachably couple a threaded mounting stud of a motor vehicle body or internal combustion engine and a functional component, such as an air filter housing air intake duct or air intake resonator so as to releaseably and supportively mount the functional component to the vehicle.

An advantage of the stud mount apparatus is to easily provide a flexible location to hard mount a functional component to a motor vehicle without requiring the customer to redesign their part. For example, it has been proposed to apply this invention to mount a large resonator that sits on top of three studs into an existing vehicle design. The resonator needs to be hard mounted but is still required to be serviceable, if needed. To take the resonator to service, the stud mount apparatus will remain in place on the studs and the resonator can be removed and re-installed after service, particularly due to the detachable mounting configuration of the component mounting feature or the stud mount apparatus. Further details of the invention are described in the Detailed Description section below.

BRIEF DESCRIPTION OF THE DRAWINGS

The accompanying Figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Features of the present invention, which are believed to be novel, are set forth in the drawings and more particularly in the appended claims. The invention, together with the further objects and advantages thereof, may be best understood with reference to the following description, taken in conjunction with the accompanying drawings. The drawings show a form of the invention that is presently preferred; however, the invention is not limited to the precise arrangement shown in the drawings.

Figure 1:
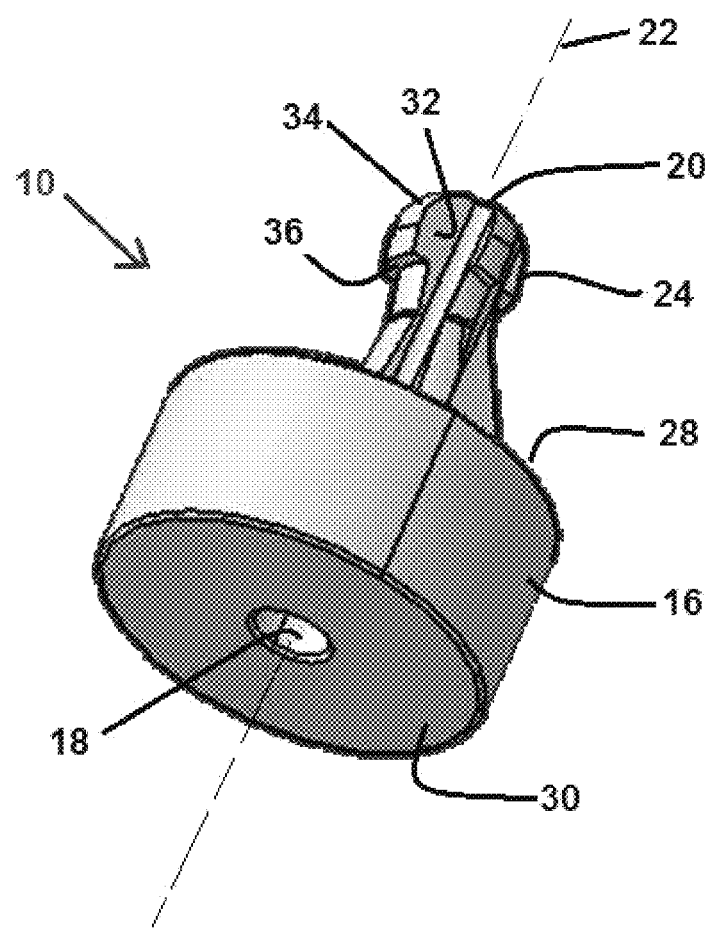
FIG. 1 schematically shows a perspective view of a multi-purpose stud mounting apparatus, consistent with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of apparatus components related to stud mount apparatus. Accordingly, the apparatus components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 schematically shows a perspective view of a multi-purpose stud mounting apparatus 10, consistent with the present invention. The multi-purpose stud mounting apparatus 10 is arranged on a central axis 22 and has a first axial side 28 and an opposing second axial side 30. A component mounting feature is formed onto and extends axially outwardly from the first axial side 28 of the base member 16. Component mounting feature 20 may be formed with and unitary one-piece with the base member 16. The component mounting feature 20 is configured to engage and detachably mount a functional component (for example, an air filter housing or resonator) onto the first axial side 28 of the base member 16 and thereby mountably support the functional component.

As shown in FIG. 1, the base member 16 of the stud mounting apparatus 10 may be generally cylindrical in shape, although other shapes, for some examples: hexagonal or rectangular, may be used.

In FIG. 1, the component mounting feature 20 is shown as a so called "turkey foot" mounting feature 24. The turkey foot mounting feature 24 includes one or more radial outwardly extending protrusions 32, each having a ramp portion 34 and a step engagement portion 36. The ramp portion 34 is operative to radially or elastically displace a receptacle wall of the socket of the functional component 14 into which the component mounting feature 20 is mountably received. The step engagement portion 36 may include step faces operable to engage one or more complimentary faces in the socket of the functional component 14 to mount the functional component 14 onto the stud mounting apparatus 10.

Figure 2:
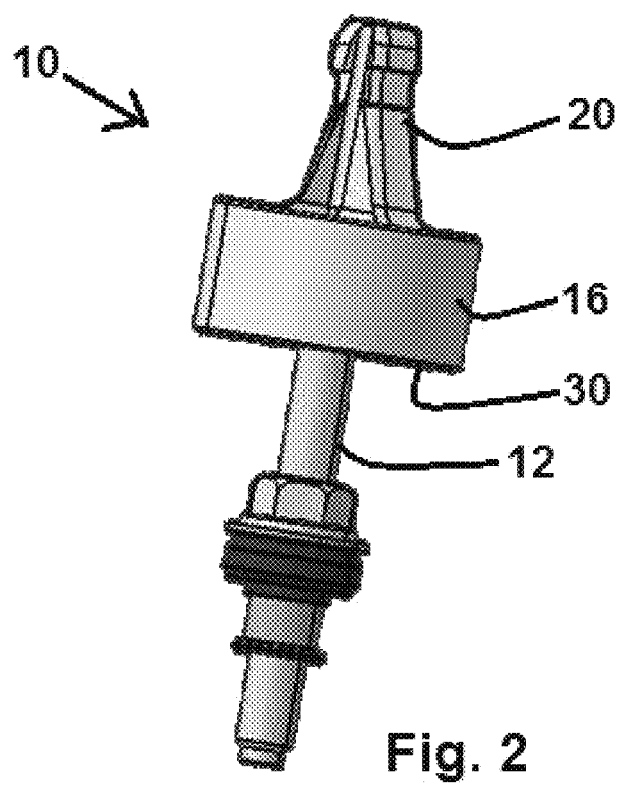
FIG. 2 schematically shows a side view of the multi-purpose stud mounting apparatus, consistent with the present invention.

FIG. 2 shows a side view of the multi-purpose stud mounting apparatus 10 in which an upper end of a threaded mounting stud 12 is threadably engaged into a threaded insert 18, the threaded insert 18 arranged in the second axial side 32 of the base member 16. The threaded mounting stud 12 is mountably fixed at some portion of its length to a fixed support surface, such as (for example) onto an interior wall of an engine compartment or onto the engine block of an internal combustion engine.

Figure 3:
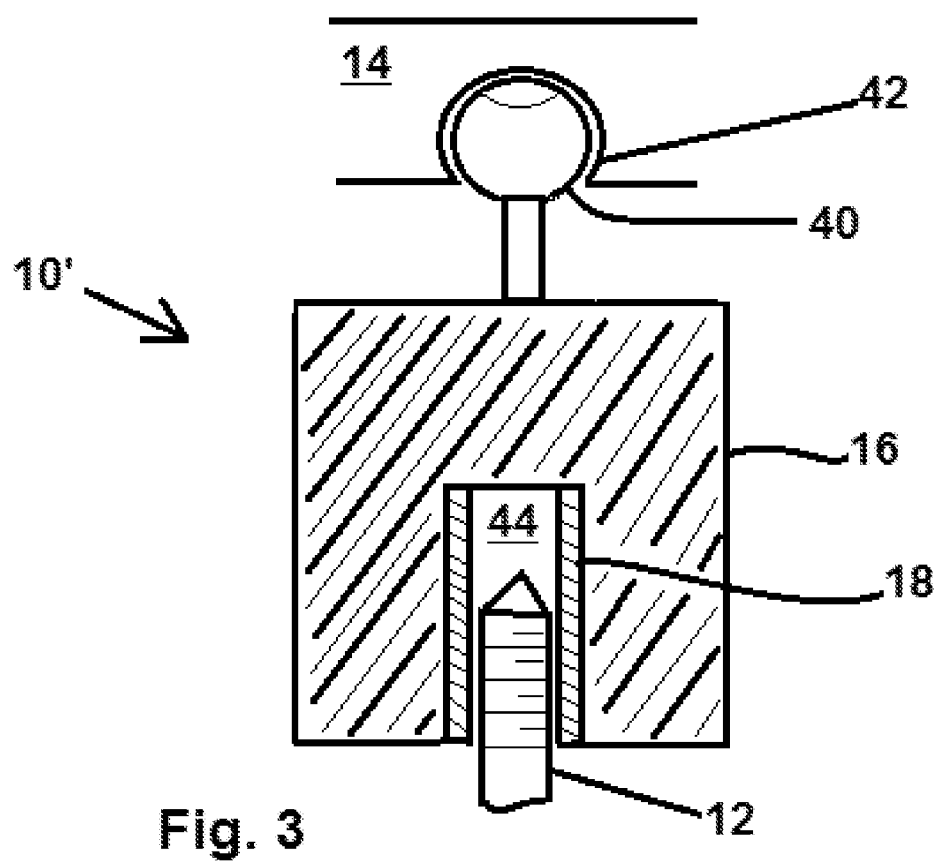
FIG. 3 schematically shows a side section view of a multi-purpose stud mounting apparatus, similar in configuration to the stud mounting apparatus of FIG. 1 and differing in that the component mounting feature is a ball stud mounting feature.

FIG. 3 schematically shows a side section view of a multi-purpose stud mounting apparatus 10', similar in configuration to the multi-purpose stud mounting apparatus 10 of FIG. 1 and differing in that the component mounting feature 20 is a ball stud mounting feature 26 rather than a turkey foot mounting feature. The ball stud mounting feature 26 includes an axial protrusion 38, for example a rod or shaft, arranged on and extending axially outwardly from the first axial side 28 of the base member 16. The axially outward end of the axial protrusion 38 terminates at a generally spherical ball structure 40 secured on the axially outward end of the axial protrusion 38. The generally spherical ball structure 40 is operable to mountably engage into a socket 42 of the functional component 14 (for example, an air filter housing or resonator) to supportively mount the functional component 14 onto the stud mounting apparatus 10.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of the present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

What is claimed is:

1. A multi-purpose stud mounting apparatus comprising:
a base member having a central axis and axially opposing first and second sides;
a component mounting feature formed on and extending axially outwardly from the first axial side of the base member, the mounting features configured to engage and detachably mount a functional component onto the first side of the base member; and
a threaded insert received into a recess formed in the base member at the second axial side, the threaded insert embedded into and securely mounted to the base member within the recess, the threaded insert having a bore configured to receive and threadably mountably engage a threaded stud into the recess;
wherein the component mounting feature is a plug-in coupling component having a turkey foot mounting feature adapted to be inserted into and snap-fit within a socket provided at the functional component, the turkey foot mounting feature comprising:
an axially elongated component mounting projection, having a first axial end formed on the first axial side of the base member, and extending axially outwardly to a second axial end, the axially elongated component mounting projection arranged on and elongated along a central axis, wherein the axially elongated component mounting projection and the bore of the threaded insert are aligned on the central axis; and
a plurality of radially outwardly extending protrusions formed on and circumferentially spaced apart about an outer circumference of the axially elongated component mounting projection, each protrusion having:
a ramp portion having a radially outer ramp surface which tapers radially outwardly, starting from the second axial end of the axially elongated component mounting projection, and continuing in an axial direction towards the base member, the ramp portion configured to elastically displace a receptacle wall of the socket into which the turkey foot mounting feature is received;
a step engagement portion having a step face extending in direction traverse to the central axis and facing the base member, the step face extending from the axially elongated component mounting projection, continuing radially outwardly to connect to the radially outer ramp surface, the step engagement portion configured to engage complimentary faces of the socket;
an engagement portion adjacent to the first axial end of the axially elongated component mounting projection, having a shoulder extending in direction traverse to the central axis and facing the step face; and
a recessed portion disposed between the step face and the shoulder, the recessed portion configured to receive the receptacle wall of the socket;
wherein the plug-in coupling component is positively retained within the socket and provides for secure retention of the functional component onto the base component.

2. The multi-purpose stud mounting apparatus according to claim 1, wherein
the base member is an injection molded component of a thermoplastic resin.

3. The multi-purpose stud mounting apparatus according to claim 2, wherein
the base member is overmolded onto a radial exterior of the threaded insert.

4. The multi-purpose stud mounting apparatus according to claim 1, wherein
the threaded insert is a cylindrical metallic insert having a cylindrical bore.

* * * * *